United States Patent [19]

Shaulis

[11] Patent Number: 5,599,233

[45] Date of Patent: *Feb. 4, 1997

[54] COAXIAL DRIVE CABLE CENTERING APPARATUS

[75] Inventor: John E. Shaulis, Carrollton, Tex.

[73] Assignee: Vinylex Corporation, Knoxville, Tenn.

[*] Notice: The term of this patent shall not extend beyond the expiration date of Pat. No. 5,364,307.

[21] Appl. No.: 290,542

[22] Filed: Aug. 15, 1994

Related U.S. Application Data

[63] Continuation of Ser. No. 509,893, Apr. 16, 1990, Pat. No. 5,364,307, which is a continuation-in-part of Ser. No. 212,077, Jun. 28, 1988, abandoned, which is a continuation of Ser. No. 786,146, Oct. 8, 1985, abandoned, which is a continuation of Ser. No. 496,826, May 23, 1983, abandoned.

[51] Int. Cl.⁶ ................. A01G 3/06; F16C 1/06
[52] U.S. Cl. ................. 464/52; 30/276; 56/12.7
[58] Field of Search ............... 464/52, 81, 112, 464/181, 182, 183; 138/38, 108; 30/276; 56/12.7

[56] References Cited

U.S. PATENT DOCUMENTS

| | | | |
|---|---|---|---|
| 2,389,166 | 11/1945 | Seaver | 263/51 |
| 3,185,532 | 5/1965 | Loch . | |
| 3,211,019 | 10/1965 | Roach et al. | 74/501 |
| 3,389,579 | 6/1968 | Werner et al. . | |
| 3,435,634 | 4/1969 | Chatham . | |
| 3,481,156 | 12/1969 | DeCsipkes . | |
| 3,581,523 | 6/1971 | Bartholomew . | |
| 3,826,068 | 7/1974 | Ballas et al. | 56/12.7 |
| 3,859,776 | 1/1975 | Ballas et al. | 56/12.7 |
| 3,877,514 | 4/1975 | Beck | 165/38 |
| 3,922,882 | 12/1975 | Kimata . | |
| 4,104,797 | 8/1978 | Ballas | 30/276 |
| 4,112,708 | 9/1978 | Fukuda . | |
| 4,161,820 | 7/1979 | Moore | 30/276 |
| 4,167,812 | 9/1979 | Moore | 30/276 |
| 4,226,021 | 10/1980 | Hoff | 30/276 |
| 4,226,288 | 10/1980 | Collins, Jr. | 175/62 |
| 4,306,619 | 12/1981 | Trojani | 165/179 |
| 4,451,983 | 6/1984 | Johnson et al. | 30/276 |
| 4,505,040 | 3/1985 | Everts | 30/296 |
| 4,759,128 | 7/1988 | Katoh et al. | 30/276 |

FOREIGN PATENT DOCUMENTS

| | | | |
|---|---|---|---|
| 3877514 | 7/1979 | Canada | 242/68.5 |
| 3021 | 12/1981 | Germany | 464/52 |
| 228403 | 10/1968 | U.S.S.R. | 384/441 |

*Primary Examiner*—Daniel P. Stodola
*Assistant Examiner*—William A. Rivera
*Attorney, Agent, or Firm*—Akin, Gump, Strauss, Hauer & Feld, L.L.P.

[57] ABSTRACT

Flexible centering apparatus for centering a flexible drive cable within a cylindrial cable housing, the centering apparatus formed of an elongated finned sleeve in which radially disposed fins engage the cable housing, the fins being free and unattached at their outer ends. In one embodiment, the centering apparatus is of uniform construction; in another embodiment, the centering apparatus is of dual durometer construction.

4 Claims, 1 Drawing Sheet

1

COAXIAL DRIVE CABLE CENTERING APPARATUS

This is a continuation application of Ser. No. 07/509,893, filed Apr. 16, 1990, now U.S. Pat. No. 5,364,307, which was a continuation-in-part of now abandoned application Ser. No. 07/212,077, filed Jun. 28, 1988, which was a continuation of now abandoned application Ser. No. 06/786,146, filed Oct. 8, 1985, which was a continuation of now abandoned application Ser. No. 06/496,826, filed May 23, 1983.

FIELD OF THE INVENTION

The present invention relates to a device for concentrically centering a flexible torque transmitting drive cable for rotation within a cylindrical cable housing, and more particularly to an apparatus of this sort having a plurality of fins extending radially from a cylindrical sleeve portion to engage the Inner surface of the cylindrical drive cable housing in order to retain the drive cable in concentric rotation with the cylindrical housing.

DESCRIPTION OF THE PRIOR ART

Frequently, in applications utilizing a flexible, torque transmitting rotary drive cable, the housing for such cable is also a structural member of the particular device interconnecting the drive and the driven members, and as such, is necessarily a larger and heavier member and has a much larger inside diameter than the outside diameter of the flexible drive cable. In devices such as this, when an excessive amount of torque is applied to the driven end of the cable, the drive cable tends to buckle and otherwise twist from a normally linear centerline or axis of rotation (or alternatively, an axis of rotation having a smooth, uninterrupted curved centerline) to a spiraled axis of rotation, the deviation from the normal centerline being limited by the distance relationship between the outside diameter of the drive cable and the inside diameter of the structural cable housing. This construction has obvious disadvantages in the form of excessive flexing of the drive cable causing accelerated material fatigue thereof. Additionally, when the drive cable buckles at high speed rotation, the "chattering" of the drive cable within the housing creates excessive friction between the rotating cable and the housing which tends to shorten the useful life of the drive cable and housing.

Attempts have been made to lessen this adverse effect by enclosing the torque transmitting drive cable within a non-metallic coaxial conduit. This has had a minimal positive effect in preventing the drive cable from "whipping" about within the structural housing, but for the most part, has been effective in reducing the noise generated by the cable rotating within the housing. Further attempts to stabilize the center of rotation of the drive cable within the housing have been in the form of periodic spacer elements positioned about the non-metallic sleeve intermittently along the length of the interface between the drive cable and the cable housing. These intermittently spaced spacer elements have also helped somewhat by drastically changing the period of resonant frequency of vibration of the drive cable as it rotates within the housing. However, during use, unless these various spacers are permanently affixed to the non-metallic drive cable sleeve, they will slide axially along the sleeve, thereby negativing any positive effect that they otherwise would have.

It is therefore an object of the present invention to provide improved apparatus for centering a flexible torque transmitting drive cable for concentric rotation within a cylindrical shaft housing that retains the drive cable concentric throughout its entire length against the natural tendency of the drive cable to buckle and twist when subjected to excessive torque.

SUMMARY OF THE INVENTION

The present invention provides apparatus for centering a flexible torque transmitting drive cable for concentric rotation within a cylindrical cable housing. The centering apparatus comprises a cylindrical sleeve portion which is adapted to receive the drive cable for rotation therein. The cylindrical sleeve portion is formed with a plurality of support members extending normal from the surface thereof (i.e., radially from a theoretical geometric center of the cylindrical sleeve portion) in a manner to engage the inside cylindrical surface of the drive cable housing to retain the cylindrical sleeve portion (and thus the torque transmitting drive cable) in continuous uniform coaxial alignment with the cylindrical drive cable housing.

The rotating drive cable is fully supported along its entire length within the cable housing by the centering apparatus of the invention to prevent the drive cable from buckling or otherwise twisting under excessive torque. In accordance with a first preferred embodiment of the invention, the centering apparatus is of uniform construction along its entire length. In accordance with an alternate embodiment, the centering apparatus is formed of an inner sleeve of one durometer hardness and an outer, finned sheath of a different durometer hardness, the dual durometer construction maintaining required wear resistance, heat resistance and rigidity, while at the same time being effective to reduce effects of vibration.

BRIEF DESCRIPTION OF THE DRAWINGS

For a detailed description of the preferred embodiments of the invention, reference is made to the accompanying drawings in which:

FIG. 4 is a depiction of an alternate embodiment of the coaxial drive centering apparatus of the invention in a cross sectional view similar to that shown in FIG. 2.

DETAILED DESCRIPTION OF THE INVENTION

Figure 1:
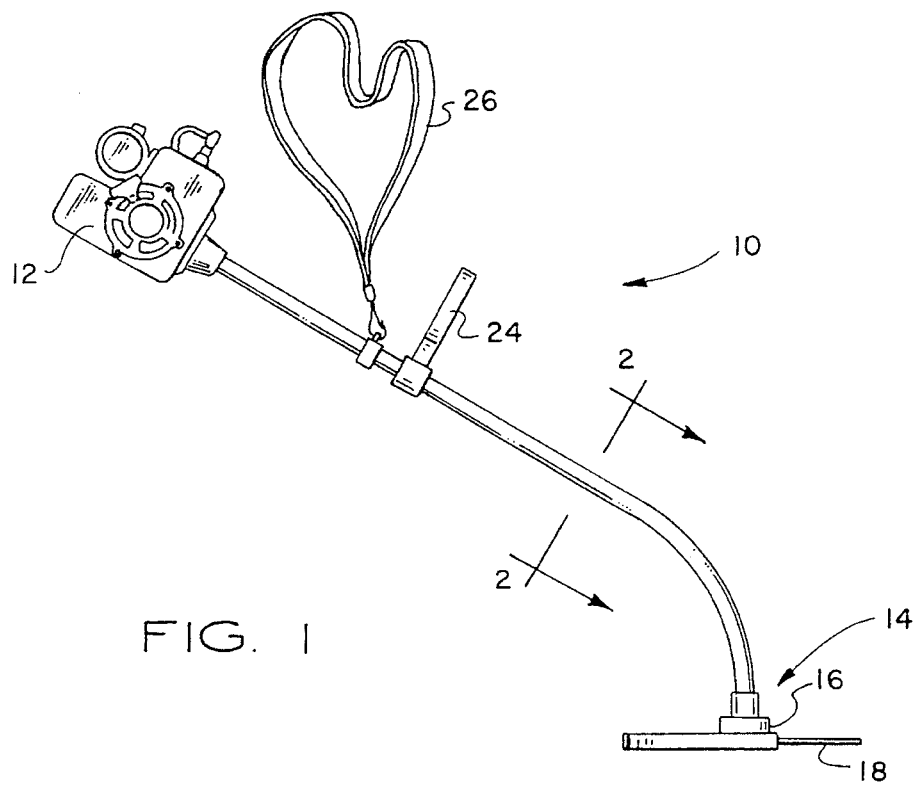
FIG. 1 is an orthographic front view of a device that utilizes the coaxial drive cable centering apparatus of the present invention.

Turning now to the drawings, wherein like parts are indicated throughout the specification and drawings with the same reference numerals, and more specifically to FIG. 1, a mechanical device utilizing the coaxial drive cable centering apparatus of the present invention is shown. In this particular application, the device 10 takes the form of a portable sling-held type lawn mowing and edging tool. This mowing and edging tool 10 comprises a motor driving unit 12, which may be either gasoline powered or electric (a gasoline powered motor is shown in FIG. 1), which is connected to a driven unit 14 comprising a rotary head 16 having a flexible cutting line 18 affixed thereto for rotating with the head in a manner to cut or trim grass, weeds, etc. along sidewalks, around trees and poles, etc. , generally where conventional rigid cutting elements may not be used.

Figure 2:
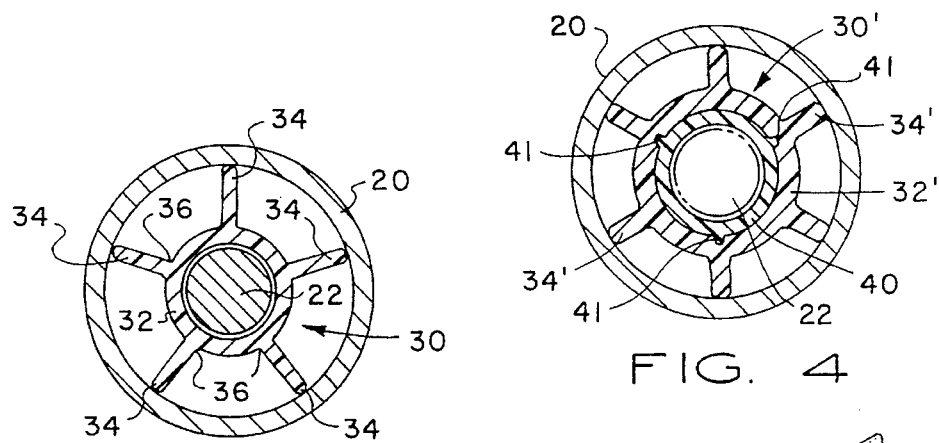
FIG. 2 is a cross sectional view of the coaxial drive cable centering apparatus as used in the device in FIG. 1, taken along lines 2—2 in FIG. 1.

The motor driving unit 12 and the driven unit 14 are interconnected by a casing 20 which, as shown in FIG. 1, takes the form of a cylindrical housing wherein a flexible torque transmitting drive cable is rotatably housed for transmitting rotational movement from the motor driving unit to the driven unit, and ultimately to the flexible cutting line 18. This flexible torque transmitting drive cable is best shown in FIG. 2 at 22 to be concentrically positioned within the casing 20. The lawn mowing and edging tool 10 also includes a handle 24 and a strap device 26 for enabling an operator to manually move the device about and cut or trim around curbs, trees, walls, etc., as desired.

Figure 3:
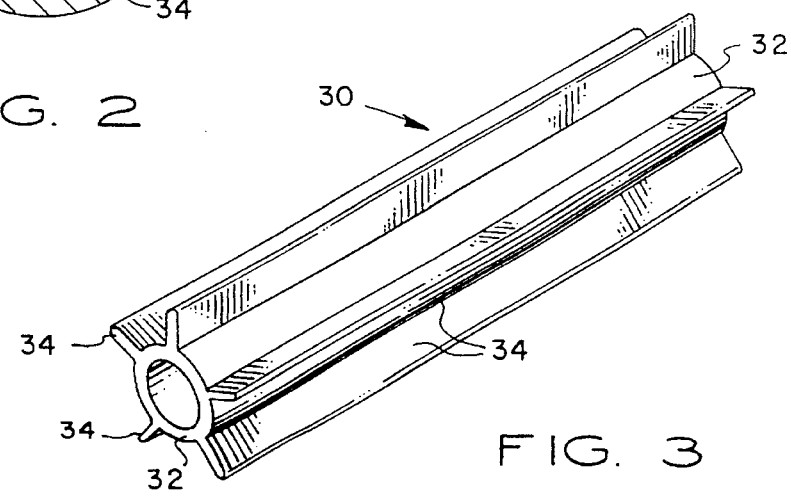
FIG. 3 is a pictorial view of just a length of the coaxial drive cable centering apparatus of the present invention, it of course being understood that the entire length of the centering apparatus extends the entire length of the cable housing.

With this background in mind, reference is now made to FIG. 3, wherein a length of the coaxial drive cable centering apparatus of the present invention is shown, generally illustrated by the numeral 30. Only a short section of the cable centering apparatus 30 is shown in FIG. 3, with the understanding that when used with the mowing and edging tool 10 of FIG. 1, the cable centering apparatus extends the entire length of the casing 20 from the motor driving unit 12 to the driven unit 14.

Returning again to FIG. 3, the coaxial drive cable centering apparatus 30 of the present invention is shown to comprise a cylindrical sleeve portion 32, to which are attached, or preferably formed therewith, a plurality of radially extending support members 34, commonly called fins. These support members or fins 34 extend normally from the outer surface of the cylindrical sleeve portion 32. Alternately stated, these support members 34 extend radially from the theoretical geometric center of the cylindrical sleeve portion 32, each fin defining a plane passing through the theoretical geometrical centerline of the cylindrical sleeve. In this preferred embodiment, it has been determined that five support members or fins 34 are sufficient to retain the cylindrical sleeve portion 32 in concentric relation ship with the flexible drive cable housing 20 (see FIG. 2). It is to be understood, however, that any number of fins 34 in excess of two may be utilized in the instant invention without departing from the spirit and scope of the invention as set forth in the appended claims.

Referring now to FIG. 2, the coaxial drive cable centering apparatus 30 of the present invention is shown in section in functional position within the flexible drive cable housing 20. Also shown is the flexible torque transmitting drive cable 22 which rotatably connects the motor driving unit 12 with the driven unit 14 of the lawn mowing and edging tool shown in FIG. 1. Each of the radially extending support members 34 comprises a fin extending normal to the outer surface of the cylindrical sleeve 32 at their respective points of union 36. As shown, each of these fins 34 comprises an elongate plane of uniform thickness across the entire surface area thereof. As shown, the thickness of these radially extending fins 34 approximates, but is not greater than, the thickness of the wall of the cylindrical sleeve 32.

As best shown in FIG. 2, the coaxial drive cable centering apparatus 10 of the present invention is positioned within the flexible drive cable housing 20, and the flexible torque transmitting drive cable 22 is then positioned concentrically within the cylindrical sleeve 32 for functional rotation therein. It will be appreciated that in this preferred embodiment of the present invention, the diametrical tolerances of the cable centering apparatus are determined by both the particular application and the particular method of installing the device within a metallic structural cable housing 20. By maintaining dimensional tolerances of the centering apparatus 30, and specifically the theoretical outside diameter thereof, the coaxial drive cable centering apparatus 30 is preferably constrained against any rotational movement within the cable housing 20, in order to more effectively maintain the concentric relationship of the cylindrical sleeve portion 32 (and therefore the flexible torque transmitting drive cable 22) relative to the flexible drive cable housing. In this regard, it should also be noted that the inside diameter of the cylindrical sleeve portion 32 is slightly larger than the outside diameter of the flexible torque transmitting drive cable 22 in order to permit free rotation of the drive cable within the sleeve.

It will be appreciated by those skilled in the art that the instant coaxial drive cable centering apparatus maintains the drive cable 22 in concentric relationship with the cable housing 20 throughout the entire length of the cable housing. This is especially important when, as shown in FIG. 1, the cable housing 20 is curved in order to direct or otherwise change the axis of rotation of the flexible cutting line 18 about the rotary head 16, relative to the axis of rotation of the driving member (not shown) of the motor driving unit 12. Those skilled in the art will also appreciate that the plurality of radially extending support members 34 function to maintain this relative concentricity even through extreme curvatures of the flexible drive cable housing 20 having a relatively short radius of curvature as shown in the device depicted in FIG. 1.

It should be pointed out that because the coaxial drive cable centering apparatus of the present invention extends the entire distance between the motor driving unit 12 and the driven unit 14, the flexible torque transmitting drive cable 22 is totally supported throughout its entire length, thereby maintaining uniform concentricity of the drive cable within the cable housing, even under extreme conditions of high speed rotation of the drive cable.

Additionally, it is contemplated that the present invention could also be formed with a second, outer cylindrical sleeve concentric with the inner cylindrical sleeve 32, and formed with the outer edges of the radially extending fins 34.

In one preferred embodiment, the coaxial drive cable centering apparatus of the present invention is formed entirely of a flexible, yet structurally stable material, such as nylon. Additionally, the cable centering apparatus is formed by extruding the apparatus in continuous length, thereafter cutting tile apparatus to length for the particular application. Of course, the coaxial drive cable centering apparatus may be formed of any other comparable material, and may be formed by bonding the plurality of fins to the cylindrical sleeve portion as necessary. It is to be understood that the product of such manufacturing process is to be considered well within the scope of the instant invention.

In accordance with an alternate embodiment of the coaxial drive cable centering apparatus of the present invention, and with reference now to FIG. 4, the centering apparatus of this alternate construction (now designated for comparison by reference number 30') is comprised, as previously described, of an elongated cylindrical sleeve 32' having a similar configuration as the sleeve 32 depicted in FIG. 3, but in this embodiment having an equal number, specifically six, radially disposed, circumferentially resilient fins 34'. In addition, however, an inner sleeve or sheath 40 is provided at, and along the entire length of, the inner circumference of outer sleeve 32', the sheath 40 being suitably interlocked with the sleeve 32' to prevent relative rotation therebetween. In the example depicted, this is accomplished by radially projecting the symmetrically disposed bosses 41 received in corresponding notches in the sleeve 32' preferably at the location of three of the fins 34'.

In accordance with a unique feature of this embodiment, the outer sleeve 32' is formed of a lower durometer hardness material than the durometer hardness of the inner sleeve 40. For example, the sleeve 40 can be formed of nylon having a durometer hardness of at least Rockwell No. R78, while the sleeve 32 may be formed of a polyolefin material having a durometer hardness, preferably between Shore No. A90 and Shore No. D65, but no more than Rockwell No. R70. In one embodiment, the sleeve 40 was formed of a hardness of approximately Rockwell No. R108, and the sleeve 32 was of a durometer hardness of approximately Rockwell No. R65. Due to this dual durometer construction, the overall desired rigidity, high wear, heat resistance and self lubrication necessary for the long wear and effective functionality of the coaxial drive centering apparatus is provided by inner sleeve 40, while the outer sheath 32', being of a lower durometer hardness, has been determined to be effective in dampening the effects of vibration and resulting noise resulting from the cable rotation.

Those skilled in the art will readily appreciate that tile overall designs of each of the disclosed embodiments of the coaxial drive cable centering apparatus of the present invention are particularly advantageous for use in connection with a portable sling-held type lawn mowing and edging tool, as shown in FIG. 1, for example.

Although preferred embodiments of the present invention have been disclosed in detail herein, it should be understood that various substitutions and modifications may be made to such preferred embodiments without departing from the scope and spirit of the present invention as recited in the appended claims.

What is claimed is:

1. In combination with rotary power transmitting apparatus of the type including drive means, means for being rotatably driven by said drive means, and a flexible, torque transmitting cable between and operably connected to said drive means and said rotatably driven means and mounted for rotation within a generally cylindrical shaped cable housing, said drive means rotating said cable and thereby said rotatably driven means, a flexible centering device extending through said cable housing for concentrically centering said cable with respect to said cable housing, said centering device comprising:

an elongated sleeve defining a generally circular cylindrical passage-way through which said cable passes, said cable being supported by said elongated sleeve in said cylindrical passageway for rotation relative to said elongated sleeve and a plurality of fins extending radially outwardly from said elongated sleeve and with respect to said cylindrical passageway a sufficient distance to contact the interior surface of said cable housing solely at the outer ends of said fins and to concentrically center said cylindrical passageway with respect to the interior of said cable housing, adjacent ones of said fins defining a space between one another and between the interior surface of said cable housing and said elongated sleeve, said fins being unconnected with one another at their outer ends, said fins each extending continuously longitudinally over a major portion of the length of said elongated sleeve, said centering device being dimensionally formed to be constrained against rotational movement within said cable housing.

2. In combination with rotary power transmitting apparatus of the type including drive means, means for being rotatably driven by said drive means, and a flexible, torque transmitting cable between and operably connected to said drive means and said rotatably driven means and mounted for rotation within a generally cylindrical shaped cable housing, said drive means rotating said cable and thereby said rotatably driven means, a flexible spacing device extending through said cable housing for spacing said cable from said cable housing, said spacing device comprising:

an elongated sleeve member defining a generally circular cylindrically shaped passageway through which said cable passes, said cable being supported by said elongated sleeve member in said cylindrical passageway for rotation relative to said elongated sleeve member, and a plurality of projections extending radially outwardly from said elongated sleeve member and with respect to said cylindrical passageway to contact the interior surface of said cable housing, said projections defining respective spaces between one another and the cable housing and each of said projections extending substantially continuously longitudinally over a major portion of the entire length of said elongated sleeve.

3. The combination as set forth in claim 2 wherein said elongated sleeve member comprises a single sleeve of uniform construction.

4. In combination:

(a) power drive means, means for being driven by said power drive means, and a flexible, drive cable coupling said driven means with said power drive means, said power drive means rotating said cable and thereby said driven means;

(b) an elongated cable housing extending between said power drive means and said driven means, said cable extending through said cable housing;

(c) a flexible centering device extending through said cable housing for essentially concentrically centering said cable with respect to said cable housing, said centering device comprising:

(i) an elongated sleeve member defining a generally circular cylindrically shaped passageway through which said cable passes, said cable being supported by said elongated sleeve member in said passageway for rotation relative to said elongated sleeve member, said elongated sleeve member having an interior wall portion of generally continuous, circular cross-section, and (ii) a plurality of spaced apart fins external to said elongated sleeve member and extending radially outwardly therefrom to contact the interior surface of said cable housing at the outer ends of said fins while the cable is essentially centered within the cable housing but adapted to engage only the interior wall portion of said elongated sleeve member, each of said fins extending substantially continuously longitudinally over a major portion of the length of said elongated sleeve member.

\* \* \* \* \*